(12) United States Patent
Ananthakrishnan

(10) Patent No.: US 10,664,463 B2
(45) Date of Patent: May 26, 2020

(54) EVENT CONTEXT ENRICHMENT

(71) Applicant: Dropbox, Inc., San Francisco, CA (US)

(72) Inventor: Santosh Ananthakrishnan, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 568 days.

(21) Appl. No.: 15/425,960

(22) Filed: Feb. 6, 2017

(65) Prior Publication Data
US 2018/0189339 A1 Jul. 5, 2018

Related U.S. Application Data

(60) Provisional application No. 62/440,552, filed on Dec. 30, 2016.

(51) Int. Cl.
G06F 16/22 (2019.01)
G06F 16/23 (2019.01)
G06F 11/30 (2006.01)

(52) U.S. Cl.
CPC ...... *G06F 16/2282* (2019.01); *G06F 11/3006* (2013.01); *G06F 16/2322* (2019.01)

(58) Field of Classification Search
CPC .......................... G06F 16/2282; G06F 16/2322
USPC ........................................................ 707/741
See application file for complete search history.

(56) References Cited

U.S. PATENT DOCUMENTS

| | | | |
|---|---|---|---|
| 5,594,899 A * | 1/1997 | Knudsen | .................... G06F 8/31 |
| 9,208,200 B1 * | 12/2015 | Stone | .................... G06F 16/248 |
| 2014/0059017 A1 * | 2/2014 | Chaney | ...................... G06F 7/08 |
| | | | 707/692 |
| 2015/0169624 A1 * | 6/2015 | Gupta | ................... G06F 16/951 |
| | | | 707/639 |

* cited by examiner

Primary Examiner — Joshua Bullock
(74) Attorney, Agent, or Firm — Hickman Palermo Becker Bingham LLP; Adam C. Stone

(57) ABSTRACT

A database structure and a system that uses the structure to facilitate efficient context enrichment of low-level events occurring in a distributed computing system. In one aspect, the database structure comprises a table accessible to a distributed storage system. The table comprises a plurality of rows. Each row represents a corresponding process creation event of a particular process at a particular host at a particular time and assigned a particular event identifier. Each row comprises a row key identifying the particular host, the particular process, the particular time, and the particular event identifier of the process creation event corresponding to the row. The particular time and the particular event identifier are stored as part of the row key in a bitwise one's complement format. The row key structure facilitates efficient identification of a process creation event where only hostname and the process identifier of the process creation event are known.

20 Claims, 8 Drawing Sheets

EVENT CONTEXT ENRICHMENT

BENEFIT CLAIM

This application claims the benefit of Provisional Appln. 62/440,552, filed Dec. 30, 2016, the entire contents of which is hereby incorporated by reference as if fully set forth herein, under 35 U.S.C. § 119(e).

FIELD ON THE INVENTION

The present disclosure relates to computing system monitoring and event log analysis, and more particularly, to a database structure and a system that uses the structure to facilitate efficient context enrichment of low-level events occurring a distributed computing system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today, many online services are implemented as complex, large-scale distributed computing systems. These online services include, but are not limited to, many Internet services used by users around the globe. Many of these online services are constructed from collections of software components often developed by different software development teams, potentially in different software programming languages. It is not uncommon for the software components of an online service to span tens, hundreds, or thousands of machines, or more, across one or more data center facilities. Solutions that help programmers, developer operations personnel (dev-ops), and other technical personnel responsible for developing and maintaining distributed computing systems reason about security and performance issues in such environments would be appreciated.

One possible solution for this is to collect data generated by machines (machine data) in the environment, index the machine data, and allow users to query the machine data via the index using a general-purpose query language. This solution can provide great flexibility to users in querying the machine data. However, due to its general-purpose nature, this solution is inefficient for event context enrichment involving determining ancestor and descendant processes, and metadata thereof, of a given process associated with an event. For example, the solution requires the user to formulate a complex query statement, and a query engine to perform a number of computationally expensive join operations, in order to achieve this enrichment. Furthermore, again because of the general-purpose nature of the solution, indexing large-volumes of machine data is slow and I/O intensive.

What is needed then is a more efficient solution for event context enrichment involving determining ancestor and descendant processes, and metadata thereof, of a given process associated with an event. Preferably, the solution will be more efficient both in terms of ease-of-use by users and in terms of computer processing of enrichment queries. The present disclosure provides a solution to this and other needs. The solution of the present disclosure may be implemented in conjunction with or in place of existing solutions for event context enrichment.

DETAILED DESCRIPTION

In the following description, for the purposes of explanation, numerous specific details are set forth in order to provide a thorough understanding of an embodiment. It will be apparent, however, that the embodiment may be practiced without these specific details. In other instances, well-known structures and devices are shown in block diagram form in order to avoid unnecessarily obscuring the embodiment.

Event Context Enrichment System

Figure 1:
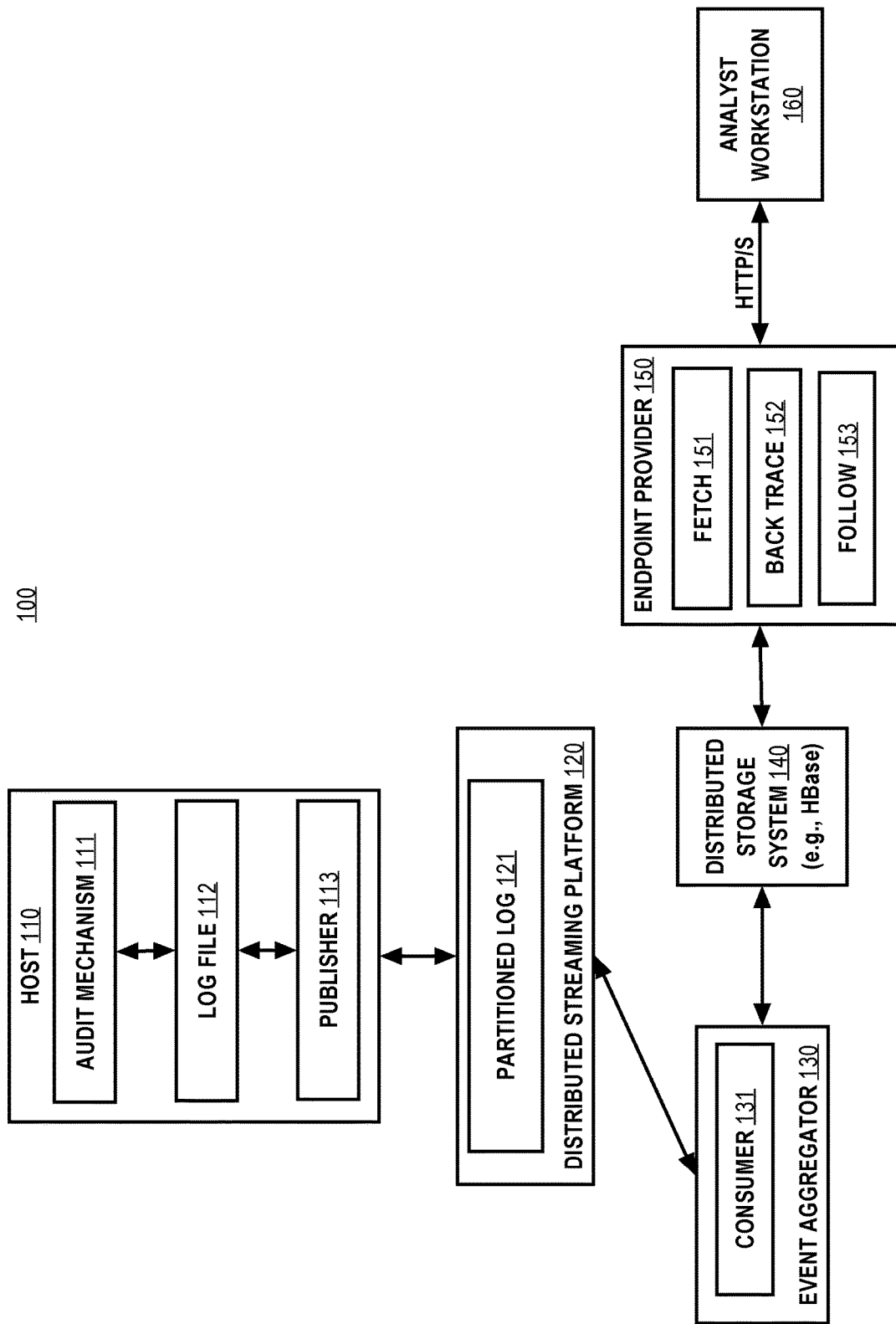
FIG. 1 is a schematic representation of an event context enrichment system of an embodiment.

As shown in FIG. 1, an event context enrichment system 100 of an embodiment can include host 110, distributed streaming platform 120, event aggregator 130, distributed storage system 140, endpoint provider 150, and analyst workstation 160. Each of these system components may be implemented, at least in part, by one or more machines such as, for example, hardware machine 700 of FIG. 7 configured with software machine 800 of FIG. 8 described below.

Hosts

Host 110 may be a physical or virtual machine configured with an operating system. For example, the operating system can be OS 810 of FIG. 8. The operating system on host 110 can be configured with an auditing mechanism 111. Auditing mechanism 111 may be configured to operate as part of the operating system and/or as an application on top of the operating system. For example, auditing mechanism 111 may execute at host 110 at kernel-level (e.g., a high-level of CPU privilege), at user-level (e.g., at a lower level of CPU privilege), or a portion of auditing mechanism 111 may execute at kernel-level and a portion at user-level.

Auditing mechanism 111 is preferably configured to detect certain system events that occur at host 110 and record information about the events as log entries in log file 112. Log file 112 may be stored at host 110 (e.g., persistently on disk at host 110).

As an alternative to persistently storing log entries on disk at host 110, log file 112 may be a "virtual" file in the sense that it appears to auditing mechanism 111 from an application programming interface (API) perspective that the log entries are being persisted to a file at host 110 but in fact log file 112 is a program that collects log entries from auditing mechanism 111 in an in-memory buffer (e.g., a circular queue) and sends to the log entries, or representations thereof, collected in the buffer over a data network to distributed streaming platform 120 for further processing. In this alternative, the log entries, or representations thereof, are essentially streamed from the auditing mechanism 111 to the distributed streaming platform 120 via "virtual" log file 112. Also in this alternative, "virtual" log file 112 may perform filtering according to a specified ruleset it is configured with. The filtering may be performed on the log entries received from auditing mechanism 111 such that only a subset of all of the log entries, or representations thereof, received from auditing mechanism 111 are forwarded on to distributed streaming platform 120 for further processing.

Process Creation Events

Preferably, auditing mechanism 111 is configured to detect process creation events and record information about the created processes in the log entries logged to log file 112. In this description, a "process" refers the combination of a program (e.g., an application program or other set of instructions) being executed on an operating system and associated bookkeeping information used by the operating system. When a program is executed, the operating system may create a new process for each instance of the program being executed. The process is like an envelope for the program which identifies the executing instance with a process number (e.g., a process identifier or "process ID") and associates other bookkeeping information to the process. One skilled in the art will appreciate that a "process" as just defined may, without limitation, refer to any of a heavyweight process, a thread, or a lightweight process.

Auditing mechanism 111 may be configured to detect process creation events in a variety of different ways and an embodiment is not limited to any particular way of detecting a process creation event. One way auditing mechanism 111 may detect a process creation event is by being notified by the operating system at host 110 when certain system calls are made. Such notification can occur via a callback from the operating system, for example. Alternatively, the operating system kernel may emit events on a netlink socket or the like. In this alternative, the auditing mechanism 111 may connect to and listen for events emitted from the kernel over this socket. Whether notified by callback or by an emitted event, the certain system calls that auditing mechanism 111 may receive notifications of may be specified by a ruleset that auditing mechanism 111 is configured with and can include system calls to create a new process.

A system call to create a new process may originate from the operating system at host 110 or from an existing process executing on operating system at host 110. For example, an instance of an application program executing at host 110 may make a system call to create a new process. The format of a system call to create a new process may take a variety of different forms and no particular system call form is required of an embodiment. For example, the form of a system call to create a new process may vary depending on the type of operating system at host 110. For example, a system call to create a new process may be an exec (e.g., execve), a fork, or a clone system call. Auditing mechanism 111 may be notified any time any of these system calls are made. However, auditing mechanism 111 may be configured by a specified ruleset to be notified of system calls and/or be configured to log entries in log file 112 only when specified types of create process system calls are made and/or only when specified programs or processes make create process system calls. Thus, auditing mechanism 111 may be notified of less than all process creation events that occur at host 110 during a given period of time and/or auditing mechanism 111 may create entries in log file 112 for less than all process creation events that occur at host 110 during a given period of time.

A log entry written to log file 112 by auditing mechanism 111 may contain a variety of information about the process that is created. This process "metadata" may include a process identifier ("process id"), a parent process identifier ("parent process id"), a process creation timestamp, and an event identifier ("event id"), among other possible process metadata information (e.g., a process name and/or a process filename).

The process id preferably is an identifier of the process created at host 110.

The parent process id preferably is an identifier of the process at host 110 that created the process. For example, the parent process id may identify the "parent" process that made the create process system call.

The process creation timestamp preferably indicates a time when the process was created at host 110. The process creation timestamp may have a predetermined time resolution. For example, the resolution of the process creation timestamp may be seconds or milliseconds.

The event identifier preferably is based on a monotonically increasing counter at host 110 and is used to differentiate between two process creation events at host 110 that are assigned the same process identifier by the operating system. For example, multiple short-lived processes created at host 110 within a short period of time (e.g., in the same second) may each be assigned the same process identifier. The event identifier may be used to differentiate these short-lived processes with the same process identifier (and their corresponding log entries logged to log file 112) from each other.

Although only a single host is depicted in FIG. 1, a practical embodiment may have many hosts (e.g., hundreds, thousands, or more). For example, host 110 may represent one of many hosts that implement a large-scale Internet service. Each host may be configured with an auditing mechanism that, according to a ruleset the auditing mechanism is configured with, detect (capture) all or a subset of all process creation events at the host and record a log entry in a log file or a virtual log file with information about the detected (captured) process creation.

Distributed Streaming Platform

Distributed streaming platform 120 preferably allows host 110 to publish, as a stream of "process creation" records, a stream of log entries logged to log file 112 by auditing mechanism 111 and preferably allows event aggregator 130 to subscribe to the stream of process creation records published by host 110. Platform 120 may also store the stream of published process creation records in a fault-tolerant manner. Each process creation record may comprise a key, a value, and a timestamp. For example, a process creation record may comprise a JavaScript Object Notation (JSON) record that uses the hostname, the process identifier, and the event identifier associated with the crated process in the record key.

Host 110 may publish a log entry to platform 120 as a process creation record and event aggregator 130 may receive the log entry from platform 120 as the process creation record. The process creation record may contain information from the log entry as part of its value such as, for example, the process identifier, parent process identifier, process creation timestamp, event identifier information described above, and any other process metadata recorded in the log entry.

The data format of the process creation record value may be the same or different from the data format of the log entry. For example, the log entry may take the form a log line in log file 112 while the process creation record value may be formatted as JavaScript Object Notation (JSON) or other lightweight data-interchange format (e.g., ProtocolBuffers, eXtensible Markup Language (XML), etc.). In addition, the process creation record key may contain a hostname of host 110 that published the process creation record so that process creation records published by one host can be distinguished from process creation records published by a different host. The hostname may be added to the process creation record at host 110 before it is published. In addition to alternatively, the hostname may be part of the log entry logged to log file 112 by auditing mechanism 111

The platform 120 may be implemented as a cluster of one or more machines. The cluster may be configured to store streams of process creation records in categories called topics. In an embodiment, platform 120 provides an application programming interface (API) that allows publisher 113 at host 110 to publish the stream of process creation records to a named topic. Publisher 113 can be implemented as a "virtual" log file 112 as described above, or as a program executed at host 110 that reads log entries from log file 112 and publishes them to the named topic as a stream of process creation records. Platform 120 may also provide an application programming interface (API) that allows consumer 131 of event aggregator 130 to subscribe to the named topic and process the stream of process creation records published by host 110 (and potentially other hosts) to that named topic.

Platform 120 may maintain partitioned log 121 for the named topic. Partitioned log 121 may be implemented as a structured commit log (e.g., as an ordered, immutable sequence of records that is appended to). Process creation records published to partitioned log 121 may be retained for a configurable period of time after which they are discarded to free up storage space in the cluster. Partitioned log 121 may be distributed over several machines of the cluster and possibly replicated across a configurable number of machines for fault tolerance. Process creation records published by host 110 to the named topic may be appended by platform 120 to partitioned log 121 in the order the process creation records are published (sent) from publisher 113 at host 110. Consumer 131 of event aggregator 131 may receive process creation records published by host 110 in the order they are stored in partitioned log 121 by platform 120.

Although publisher 113 at host 110 may publish all process creation records corresponding to log entries logged by auditing mechanism 111 to the same named topic, publisher 113 may distribute publication of process creation records across multiple named topics. Along the same lines, multiple hosts may publish process creation records to the same named topic or to different named topics. Thus, there is not requirement that only one named topic or the same named topic be used by hosts.

Event Aggregator

Consumer 131 at event aggregator 130 subscribes to and pulls process creation records from the named topic. Preferably, the process creation records consumer 131 subscribes to and pulls from platform 120 are those published by host 110 (and potentially other hosts) to the named topic.

Event aggregator 130 may inspect process creation records pulled from the named topic. Such inspection may be performed before event aggregator 130 stores a representation of the process creation record in distributed storage system 140. Event aggregator 130 may inspect process creation records pulled from the named topic to ensure they are well-formed. For example, event aggregator 130 may inspect a process creation record to ensure it contains all of a hostname, a process id, a parent process id, a process creation timestamp, and an event id. If a process creation record passes inspection by event aggregator 130, then the process creation record is stored as a row or rows in distributed storage system 140 as described in greater detail below. If a process creation record does not pass inspection, then the process creation record is not stored in distributed storage system 140 (e.g., it is discarded).

While event aggregator 130 may aggregate process creation records published by one or more hosts to a single named topic, event aggregator 130 may aggregate process creation records published by one or more hosts to multiple named topics. Thus, there is not requirement that the event aggregator 130 aggregate process creation records published by only a single host or to only a single named topic. Instead, event aggregator 130 may aggregate process creation records published by multiple hosts to one or more named topics.

Distributed Storage System

Distributed storage system 140 preferably includes a particular table structure that facilitates efficient processing of fetch, back track, and follow enrichment queries as described in greater detail below. To take full advantage of the particular table structure, distributed storage system 140 preferably organizes process creation event data in tables. Each row of a table preferably comprises a row key and an associated group of one or more column values. The row key may uniquely identify the row within the table. Distributed storage system 140 may treat a row key for purposes of data storage and retrieval operations as a sequence of bytes of arbitrary length.

Preferably, distributed storage system 140 supports the following fundamental data storage and retrieval operations, or their equivalents, and which may go by different names in the context of different distributed storage systems:

Put Operation: Input parameters to a Put Operation can include a table name, a row key, and a mapping from one or more column names to one or more corresponding column values. If a row by the row key does not already exist in the table, then a new row is added to the table. Otherwise, the existing row is updated.

Get Operation: Input parameters to a Get Operation can include a table name, a row key, and a set of one or more column names. If the row by the row key exists in the table, then the column values corresponding to the given columns names are returned.

Scan Operation: Input parameters to a Scan Operation can include a table name, a range of row keys, and a set of one or more column names. The range may be specified by a start row key and an end row key. The start row key may be inclusive and the end row key exclusive. All columns values corresponding to the specified column names in all rows of the table having a row key within the specified range are returned. A row key may be considered within the specified range if it is byte-wise equal to or greater than the start row key of the range and strictly less than the end row key of the range.

Preferably, distributed storage system 140 stores rows of a table on disk in byte-wise sorted order of the row keys of the rows. Stated otherwise, the rows are sorted on disk byte-lexicographically by row key. As a result, rows related by row key are stored near each other on disk, thereby allowing the Scan Operation over a range of row keys to be efficient because sequential disk access, which is typically faster than random disk access, can be performed over the rows as stored on disk to provide a result for the Scan Operation. In some cases, rows of a table may be partitioned across multiple disks, for example, if the table contains a large number of rows. In this case, depending on the range of rows keys specified in the Scan Operation, distributed storage system 140 may need to access multiple disks.

In an embodiment, distributed storage system 140 comprises an Apache HBase or Apache Cassandra cluster. However, distributed storage system 140 is not limited to being implemented by those database systems and one skilled in the art will appreciate from this description that other database systems could be substituted according to the requirements of the particular implementation at hand.

Endpoint Provider

Endpoint provider 150 provides a representational state transfer (REST) or RESTful web service or the like to an analyst at analyst workstation 160. Endpoint provider 150 may provide three endpoints for event context enrichment. The three endpoints are designated in FIG. 1 as fetch endpoint 151, back track endpoint 152, and follow endpoint 153. Each of the three endpoints may be invoke-able in a RESTful manner at corresponding Uniform Resource Locators (URLs). A URL for any one of the three endpoints may be submitted from analyst workstation 160 to endpoint provider 150. For example, analyst workstation 160 may be configured with a web browser application that the analyst uses to submit a URL to the endpoint provider 150.

Upon receiving a URL from analyst workstation 160 corresponding to one of the three endpoints, endpoint provider 150 queries distributed storage system 140 to collect the requested information and return it to analyst workstation 160 for presentation in a graphical user interface (e.g., a web browser window) to the analyst at analyst workstation 160.

A URL corresponding to one of the three endpoints 151, 152, 153 may be submitted in an enrichment request along with parameters of the enrichment request. The enrichment request may be formatted as a HyperText Transfer Protocol (HTTP) GET request, for example. An enrichment request has three required parameters and one optional parameter. The three required parameters include a hostname, a timestamp, and a process identifier. An event identifier may be included as an optional parameter.

Analyst Workstation

The analyst at analyst workstation 160 may know limited information about an event that occurred at a host. Given the limited information, the analyst may want to conduct a further investigation of the event to find out why the event occurred. For example, the analyst may receive an alert that a file containing sensitive information (e.g., user passwords) was read at a host. The alert may provide limited context about the event. In particular, the alert may specify the sensitive file that was read or some other indication about why the alert was generated, the hostname of the host at which the read occurred, the process id of the process at the host that read the sensitive file, and a timestamp indicating when the read occurred or when the alert was generated. From this limited information, the analyst may not be able to determine why the event occurred or why the sensitive file was read.

Reading a sensitive file is just one example of an event about which the analyst might want additional information. More generally, the analyst might want additional information about any low-level event that occurs at a host that the analyst learns of through an alert or otherwise. The low-level event may include, but is not limited to, a process at a host reading or attempting to read from a particular file, a process at a host writing or attempt to write to a particular file, a process at a host adding or attempt to add a file to a particular directory, a process at a host removing or attempting to remove a file from a particular directory, among other low-level events.

Using information the analyst knows about the event, the analyst can use the analyst workstation 160 to submit an enrichment request to endpoint provider 150. The enrichment request may specify a hostname, a process identifier, and a timestamp pertaining to the event. Optionally, the enrichment request may additionally specify an event identifier pertaining to the event.

If the enrichment request is to the fetch endpoint 151, then endpoint provider 150 queries database storage system 140 to collect and return to analyst workstation 160 information about a "target" process that satisfies the parameters of the enrichment request. An algorithm of an embodiment for efficiently identifying the target process in response to a fetch enrichment request is described below with respect to FIG. 4.

If the enrichment request is to the back trace endpoint 152, then endpoint provider 150 queries database storage system 140 to collect and return to analyst workstation 160 information about a target process that satisfies the parameters of the enrichment request and information about ancestor processes of the target process. An algorithm of an embodiment for efficiently identifying the target process and the ancestor processes in response to a back trace enrichment request is described below with respect to FIG. 5.

If the enrichment request is to the follow endpoint 153, the endpoint provider 150 queries database storage system 140 to collect and return to analyst workstation 160 information about a target process that satisfies the parameters of the enrichment request information about descendent processes of the target process. An algorithm of an embodiment for efficiently identifying the target process and the descendant processes in response to a follow enrichment request is described below with respect to FIG. 6.

The information that is returned by endpoint provider 150 to analyst workstation 160 in response to an enrichment request may vary depending on which endpoint 151, 152, or 153 is invoked. If the target endpoint is the fetch endpoint 151, then "fetch" information is returned and may include information about an identified target process. If the target endpoint is the back trace endpoint 152, then "back trace" information is returned and may include information about an identified target process and information about identified ancestor processes of the target process. If the target endpoint is the follow endpoint 153, then "follow" information is returned and may include information about an identified target process and information about descendant processes of the target process. Fetch information, back trace information, and follow information may be sent from endpoint provider 150 to analyst workstation 160 in one of a variety of different data interchange formats including, but not limited, JSON, XML, ProtocolBuffers, etc.

Fetch information, back trace information and follow information received by analyst workstation 160 from endpoint provider 150 in response to submitting an enrichment request can be displayed in a graphical user interface at analyst workstation 160 to the analyst.

The displayed fetch information may present certain information about the identified target process including information about the target process stored in distributed storage system 140. This information may include, but is not limited to, a hostname, a process identifier, a parent process identifier, a timestamp, a process name, among other information about the process.

The displayed back trace information may present information about the target process and the identified ancestor processes as a list where the first or last item in the list corresponds to the target process and each of the other items in the list corresponds to one of the ancestor processes. The items may be ordered in the presented list in order of the corresponding process creation times. Thus, the item corresponding to the target process will be the first (or last) item in the list, the parent ancestor process of the target process will be the second (or next to last) item in the list, and so on. For the presented list, the analyst is provided enriched context about the target process in the form of a list of ancestor processes of the target process.

The follow information may present information about the target process and identified descendant processes as a tree comprising nodes and edges where the root node of the tree corresponds to the target process and each of the other nodes in the tree corresponds to one of the descendant processes. A direct edge between two nodes in the tree represents a parent-child relationship between the two processes corresponding to the two nodes. For example, the root node of the tree may represent the target process and nodes directly connected to the root node by edges may represent child processes of the target process, and nodes directly connected to those child nodes may represent grandchild processes of the target process, nodes directly connected to those grandchild nodes may represent great grandchild processes of the target process, and so on.

Analyst workstation 160 may be any one of a variety of different types of personal computing devices such as, for example, a desktop computer, a laptop computer, a workstation computer, a tablet computer, or other type of personal computing device. Analyst workstation 160 may have hardware components like those of hardware machine 700 described below and configured with a software system like 800 described below.

Execs Table Structure

As mentioned above, distributed storage system 140 preferably stores table rows on disk in byte-wise sorted order of row keys thereby facilitating efficient Scan Operations using sequential disk access. In an embodiment, processing of a fetch and a back trace enrichment request is facilitated by an "execs" table in distributed storage system 140.

Figure 2:
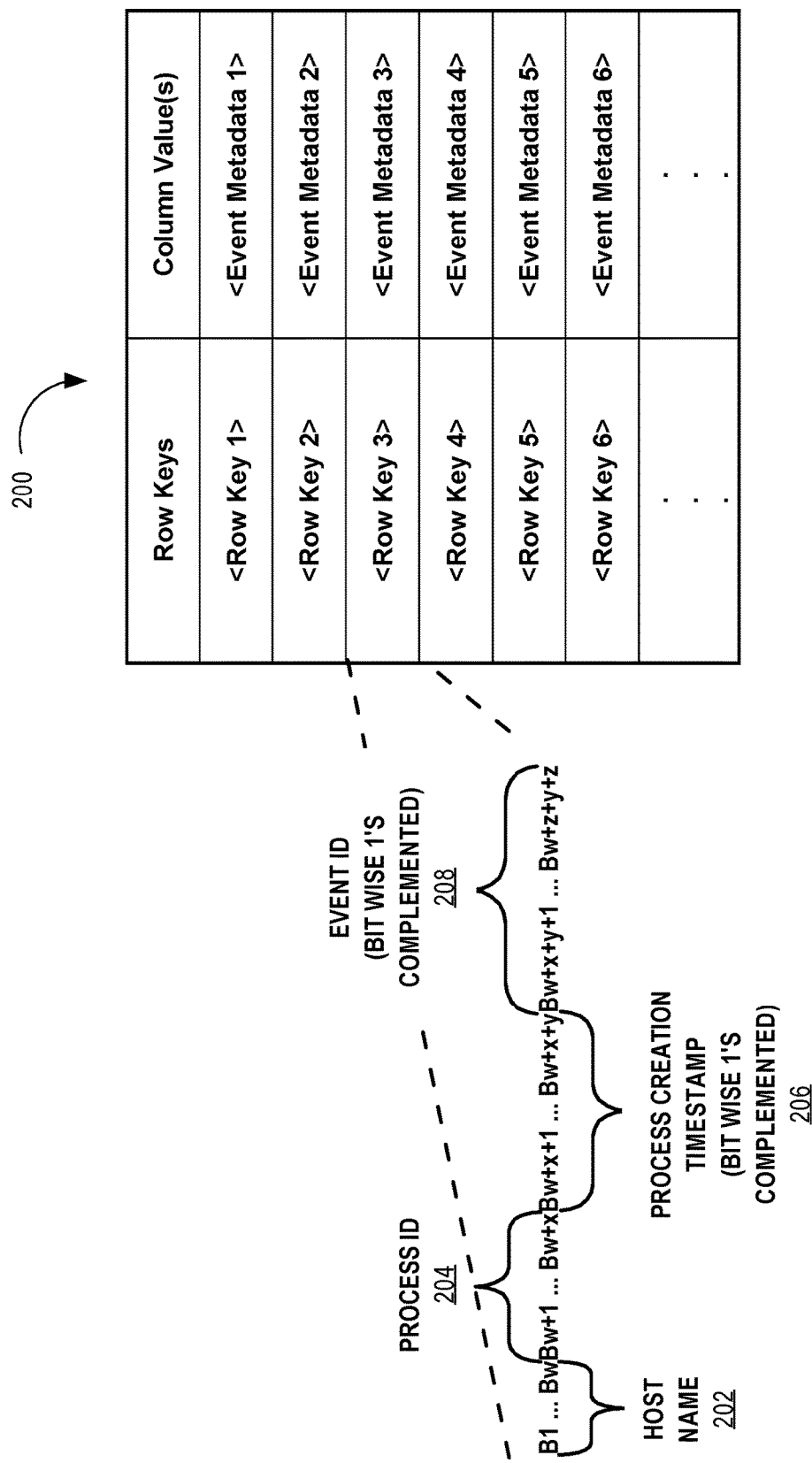
FIG. 2 is a schematic representation of an execs table of an embodiment.

FIG. 2 is a schematic representation of an execs table 200 of an embodiment. A row of table 200 may represent a process creation event at a host. Execs table 200 may store rows corresponding to processing creation events at multiple hosts.

A row of table 200 comprises a row key and one or more column values. Each row of table 200 is uniquely identified by its row key. The structure of the row key is designed to facilitate efficient processing of enrichment requests. The column value(s) of the row contain metadata about the process creation event such as hostname, process id, parent process id, timestamp, process name, event id information about the created process.

The structure of the row key is designed to efficiently answer an enrichment request in which the hostname, process identifier, and a timestamp is known and provided by the analyst and the task of processing the enrichment request is to find the process that was assigned the process identifier, at the host with the hostname, and at the time specified by the timestamp.

As shown in FIG. 2, each row key of table 200 comprises a hostname field 202, followed by a process identifier field 204, which is followed by a timestamp field 206, and which is followed by an event identifier field 208. Each field 202, 204, 206, and 208 is preferably a fixed byte-length such that, in each row key of table 200, the hostname field 202 is represented by the first W bytes of the row key, the process identifier field 204 is represented by the next X bytes of the row key, the timestamp field 206 is represented by the next Y bytes of the row key, and the event identifier field 208 is represented by the next Z bytes of the row key. The values W, X, Y, and Z may be the same or different and may vary according to the requirements of the particular implementation at hand. Preferably, however, all row keys of table 200 are W+X+Y+Z bytes in length, the length W of the hostname field 202 is the same in each row key of table 200, the length X of the process identifier field 204 is the same in each row key of table 200, the length Y of the timestamp field 206 is the same in each row key of table 200, and the length Z of the event identifier field 208 is the same in each row key of table 200.

While in some embodiments the order of the fields 204, 204, 208, and 208 in a row key of table 200 is as described above, the order of the fields in a row key is different in other embodiments. The order may vary depending on which fields are expected to be specified exactly in enrichment requests for a process creation event of interest. For example, the order fields described above is useful when enrichment requests are expected to specify an exact hostname and an exact process identifier of the process creation event of interest but may specify only an approximate timestamp, and may or may not specify an event identifier. On the other hand, if enrichment queries are expected to specify an exact timestamp of the process creation event of interest, then the first field in a row key of table 200 may be the timestamp field 206 followed by some order of the hostname field 202, the process identifier 204, and the event identifier field 208.

In an embodiment, the length W for the hostname field 202 is 5 bytes, the length X for the process identifier field 204 is 4 bytes, the length Y for the timestamp field 206 is 4 bytes, and the length Z for the event identifier field 208 is also 4 bytes in length resulting in a 17 byte length row key exclusive of any end of row key delimiter byte or bytes.

In an embodiment, the hostname is able to be represented in 5 bytes by using an encoding scheme that follows a hostname naming convention of an online service. According to the hostname naming convention, each hostname is a 14 byte value specifying the location of the host by datacenter, row, rack, position, and chassis. The encoding scheme represents the value of each of these five components by a single byte resulting in a 5 byte encoding of the hostname for the row key.

A row in execs table 200 may correspond to a process creation event at a host. As indicated above, the row key of the row is composed of a combination of the hostname, the process id, the process creation timestamp, and the event id for the process creation event represented by the row. The column values of the row include various metadata about the represented process creation event including, for example, the hostname, the process id, the parent process id, the process creation timestamp, and the process name and/or filename. The columns values may be stored in the execs table 200 in a data interchange format such as, for example, JSON, XML, ProtocolBuffers, or the like.

As mentioned above, an enrichment request may specific a hostname, a process id, a timestamp, and an event id. In that case, the endpoint provider 150 can retrieve the row in the execs table 200 representing the target process of the enrichment request directly with a Get Operation. This is possible because the enrichment request provides values for all four fields 202, 204, 206, and 208 of the row key. The row key parameter of the Get Operation can be formed by the endpoint provider 150 by combining the hostname, the process id, the timestamp, and the event id in the enrichment request in the form of the row key and then issuing the Get Operation against the distributed storage system 140 with the formed row key parameter to directly retrieve the row and associated column values pertaining to the target process.

However, it is expected that in many cases the analyst may not know the event id of the target process interest. For example, the alert received by the analyst may not provide an event id. In this case, an event id may not be specified in the enrichment request. In this case, the endpoint provider 150 may perform a Scan Operation against distributed storage system 140 to identify the target process.

The Scan Operation may be processed by the distributed storage system 140 by scanning forward through the execs table 200 starting at the first row of the exec table 220 that is greater than or equal to the start of the range of the Scan Operation and scanning forward through the table 200 until a row is reached that is equal to or greater than the end of the range of the Scan Operation. For a fetch enrichment request or a back track enrichment request that does not specify an event id as a parameter of the request, then the endpoint provider 150 invokes the distributed storage system 140 to scan the execs table 200 for the most recent process creation event that occurred at a host with the hostname specified in the enrichment request, where the created process had the process id specified in the enrichment request, and that is earlier in time than the time of the timestamp specified in the enrichment request.

The time of the timestamp field 206 of a row key may be represented as an integer value specifying a number of time units (e.g., seconds) since an epoch.

The identifier of the event id field 208 of a row key may be represented as an integer value of monotonically increasing counter.

To make the Scan Operation efficient, the timestamp field 206 and the event identifier field 208 of each row key in the execs table 200 is preferably stored in a bitwise one's complement format. By doing so, the rows of the execs table 200 for the same hostname and same process id representing the most recent process creation events for the given hostname and for the given process id are stored earlier in the table. Recall that rows of a table in distributed storage system 140 may be stored on disk in byte-wise sorted order of their row keys.

As a result of bitwise one's complement format of the timestamp field 206 and the event identifier field 209, the Scan Operation submitted by the endpoint provider 150 to the distributed storage system 140 in response to receiving a fetch or back track enrichment request that does not specify an event identifier may include a start scan row key composed of the following components in the following order concatenated together:

(1) The hostname of the enrichment request formatted according to the row key format (e.g., encoded).

(2) The process id of the enrichment request formatted according to the row key format.

(3) The timestamp of the enrichment request bitwise one's complemented formatted according to the row key format.

(4) A zero valued byte (\x00) for each byte of the event id field 208.

When composing the start scan row key for the Scan Operation, fields within the start scan row key can be padded with a zero value byte or other predetermined value byte so that the byte lengths of the fields of the start scan row key match the byte lengths of the fields of the row keys in execs table 200.

The end scan row key may be composed of the following components in the following order concatenated together:

(1) The hostname as in the start scan row key.

(2) The process id as in the start scan row key.

(3) The highest valued byte (\xFF) for each byte of the timestamp field 206.

(4) The highest value byte (\xFF) for each byte of the event id field 208.

By forming the start scan row key and the end scan row key this way, the first row returned by the Scan Operation, when performed against the execs table 200, is the row representing the target process. Once this row is obtained by the endpoint provider 150, the Scan Operation can be stopped. If no row is returned, then the execs table 200 does not store a row for the target process. If a row is returned for the target process, it can contain column values from the row including the hostname of the host of the target process, the parent process id of the target process, the time of creation of the target process, and the event id of the target process.

For a back track enrichment request, the above Scan Operation can be repeated. In particular, a second Scan Operation is performed but this time using the parent process id of the target process for the process id field 204 and the process creation timestamp of the target process, bitwise one's complemented, for the timestamp field 206 when forming the start scan row key and the end scan row key as described above. If a row is returned, it represents the parent process of the target process unless the process creation timestamp of the process represented by the row equals the process creation timestamp of the target process (e.g., the processes were created at the host in the same second) and the event id of the process represented by the row is not less than the event id of the target process. In this case, the process represented by the row cannot be the parent process and the row is ignored and the Scan Operation continues forward until a row is found that satisfies this criterion.

The above process can be repeated until all ancestor processes of the target process are identified in the execs table 200.

Parents Table Structure

Both a fetch enrichment request and a back trace enrichment request can be processed by the endpoint provider 150 against the execs table 200 in distributed storage system 140. However, for the follow enrichment request, identifying descendant processes of a target process using the execs table 200 would require a Scan Operation through all rows in the execs table 200 for a given hostname following the target process. To speed up processing of follow enrichment requests, a separate "parents" table is used in distributed storage system 140.

Figure 3:
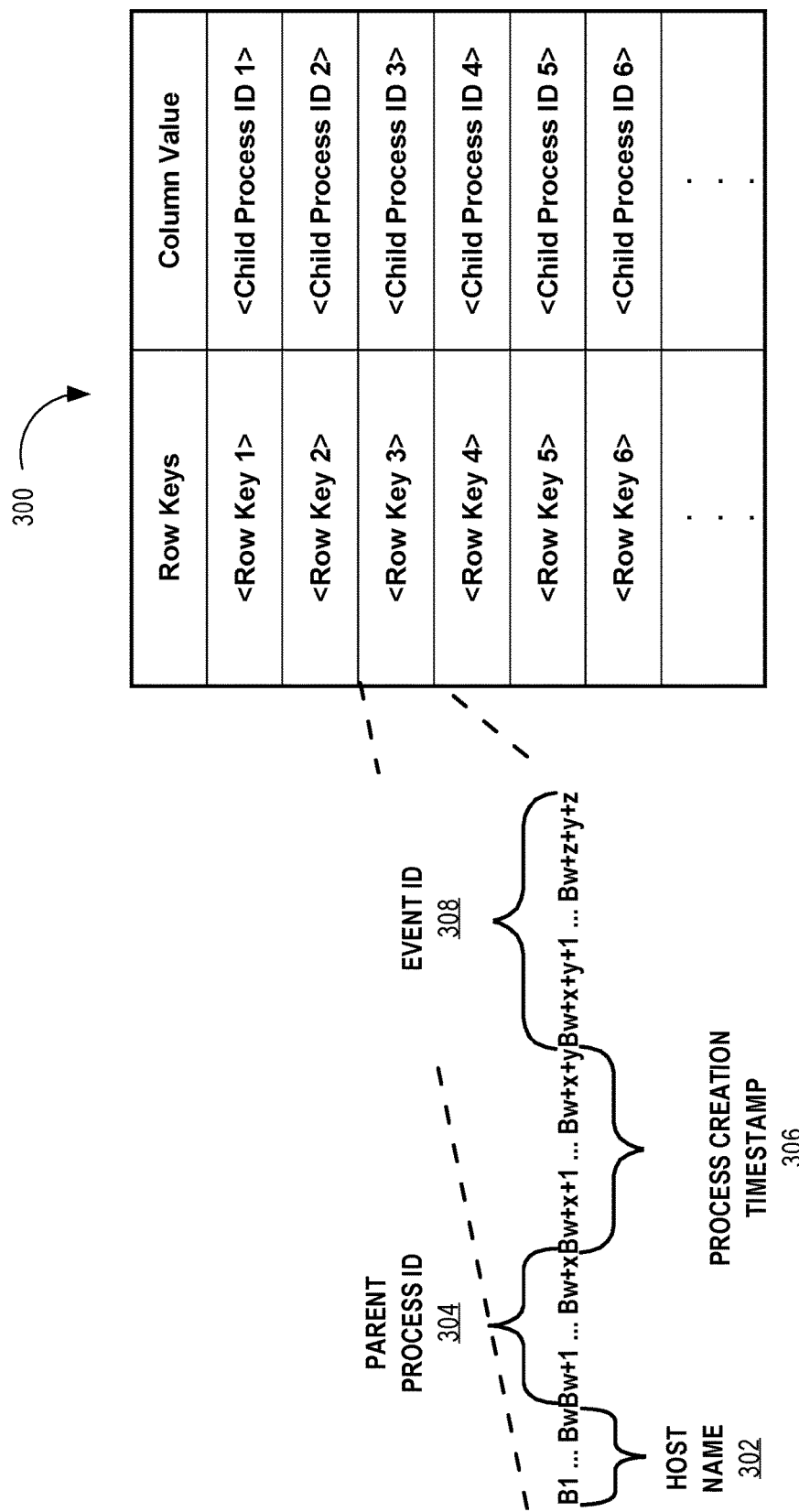
FIG. 3 is a schematic representation of a parents table of an embodiment.

FIG. 3 is a schematic representation of the parents table 300 according to an embodiment. When a row is added to the execs table 200 for a process creation event for which a parent process id is available, a row is also added to the parents table 300 for the process creation event. The row added to the parents table 300 represents that the process identified by the parent process id created the child process represented by the row added to the execs table 200. Like the row key format of rows in the execs table 200, the row key format of rows in the parents table 300 also has a hostname field 302, a timestamp field 306, and an event id field 308. The values of the hostname field 302, the timestamp field 306, and the event id field 308 of the row added to the parents table 300 for the process creation event match the values of the hostname field 202, the timestamp field 206, and the event id field 208 of the row added to the exces table 200 for the process creation event. However, unlike the values of the row for the timestamp field 206 and the event id field 208 in the execs table 200, the value of the row for the timestamp field 306 and the event id field 308 in the parents table 300 are not stored in a bit wise one's complement format.

Further, instead of storing the process id of the child process as is included as the value of the process id field 204 of the row added to the execs table 200, the parent process id of the parent process identifier is stored as the value of the parent process id field 304 of the row added to the parents table 300. Further, the column value of the row added to the parents table 300 is the process id of the child process. Thus, the row added to the parents table 300 represents that a first "parent" process, having a process id identified by the value of the parent process id field 304, created a second "child" process, identified by the column value of the row, at a host with the a hostname identified by the value of the hostname field 302, at a time specified by the value of timestamp field 306 (i.e., the process creation time of the child process), and with an event identifier specified by the value of the event id field 308 (i.e., the event id of the child process creation event).

A process for determining the descendant processes of a target process of an enrichment request using the execs table 200 and the parents table 300 is described in greater detail below with respect to FIG. 6.

Fetch Enrichment Request

Figure 4:
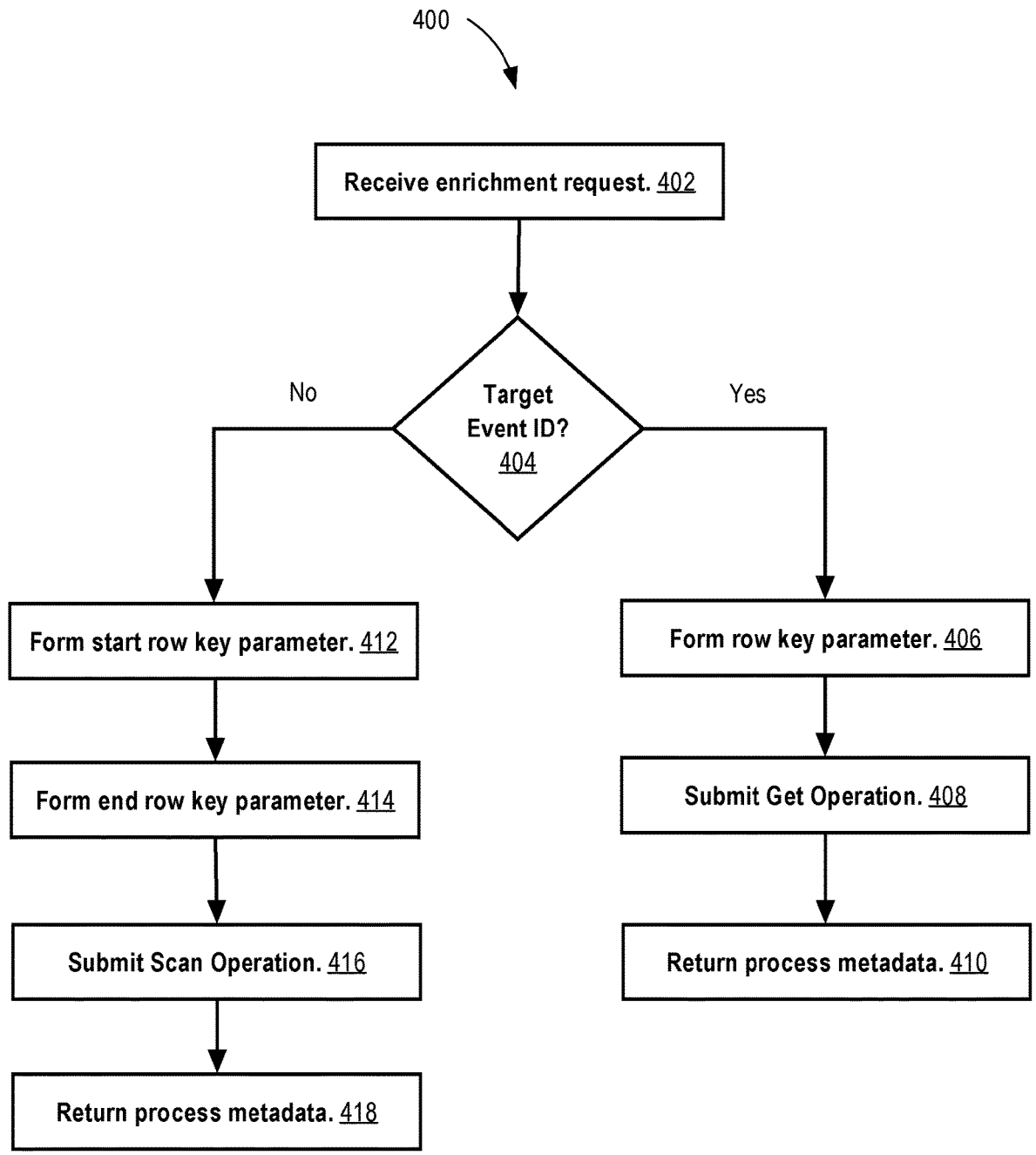
FIG. 4 is a flowchart representation of a method of an embodiment for processing a fetch enrichment request.

Turning now to FIG. 4, it is a flowchart 400 of a method performed by the endpoint provider 150 in processing an enrichment request from analyst workstation 160 according to an embodiment.

At operation 402, the enrichment request is received at the fetch endpoint 151 of the endpoint provider 150. The enrichment request specifies at least a target hostname, a target process id, and a target timestamp. The target hostname, the target process id, and the target timestamp may be provided by an analyst at analyst workstation 160, for example. The enrichment request may optionally specify a target event id, for example, if the target event id is available to the analyst.

At operation 404, the endpoint provider 150 inspects the enrichment request to determine if the optional event id parameter is specified. If a target event id is specified in the enrichment request, then the method proceeds to operation 406. Otherwise, the method proceeds to operation 412.

At operation 406, the endpoint provider 150 forms a row key parameter for submission in a Get Operation to distributed storage system 140. The row key parameter is formed based on the target hostname, the target process id, the target timestamp, and the target event id provided in the enrichment request. Specifically, these input parameters are formatted in accordance with the format of the row keys in the execs table 200 and then the formatted input parameters concatenated together to form a sequence of bytes representing the row key parameter for the Get Operation. Such formatting may involve encoding the target hostname in accordance with the encoding format of the hostname field 202. Such formatting may also involve taking the bitwise one's complement of the target timestamp and the target event id. Fields within the row key parameter may also be padded with a predetermined byte value (e.g., \x00) so that the byte length of each field in the row key parameter matches the byte field lengths of the hostname 202, process id 204, timestamp 206, and event id 208 fields, respectively, of the row keys of the execs table 200.

At operation 408, the endpoint provider 150 submits a Get Operation to distributed storage system 140 for execution against execs table 200. The row key parameter formed at operation 406 is provided by the endpoint provider 150 in the submission of the Get Operation.

At operation 410, if a row in the execs table 200 having a row key that matches the row key parameter exists, then the column value(s) of the row are returned to the endpoint provider 150. The endpoint provider 150 than provides the column value(s) to the analyst workstation 160 as an answer to the enrichment request received at operation 402.

At operation 412, if the enrichment request did not specify a target event id, then a start row key parameter for a to-be-performed Scan Operation is formed based on the target hostname, the target process id, and the target timestamp in the enrichment request received at operation 402. The start row key parameter may be formed similar to how the row key parameter is formed in operation 406 except that the event id field of the start row key parameter may be formed as a sequence of bytes where each byte has a minimum byte value such as, for example, zero (\x00). The length of the sequence bytes for the event id field of the start row key parameter may be equal to the length of the event id field 208 of the row keys of the execs table 200.

At operation 414, the end row key parameter for the Scan Operation is formed. The values of the hostname field and the process id field of the end row key parameter may equal the values of the hostname field and the process id field of the start row key parameter. However, the value of the timestamp field of the end row key parameter may be formed as a sequence of bytes which each byte has a maximum byte value such as, for example, two hundred and fifty-five (\xFF). The length of the sequence bytes for the timestamp field of the end row key parameter may be equal to the length of the timestamp field 206 of the row keys of the execs table 200. Similarly, for the end row key parameter, the event id field of the end row key parameter may be formed as a sequence of bytes where each byte has a maximum byte value such as, for example, two hundred and fifty-five (\xFF). The length of the sequence bytes for the event id field of the end row key parameter may be equal to the field length of the event id field 208 of the row keys of the execs table 200.

At operation 416, the Scan Operation with the formed start row key parameter and the formed end row key parameter is submitted to the distributed storage system 140. The start row key parameter and the end row key parameter defined the range of the Scan Operation.

At operation 418, the column value(s) of the first row returned by the distributed storage system 140 after initiating the Scan Operation are provided to the analyst workstation 160 as an answer to the enrichment request received at operation 402.

The column value(s) received by the analyst workstation 160 may be presented to the analyst in a graphical user interface (GUI) at the analyst workstation.

Back Trace Enrichment Request

Figure 5:
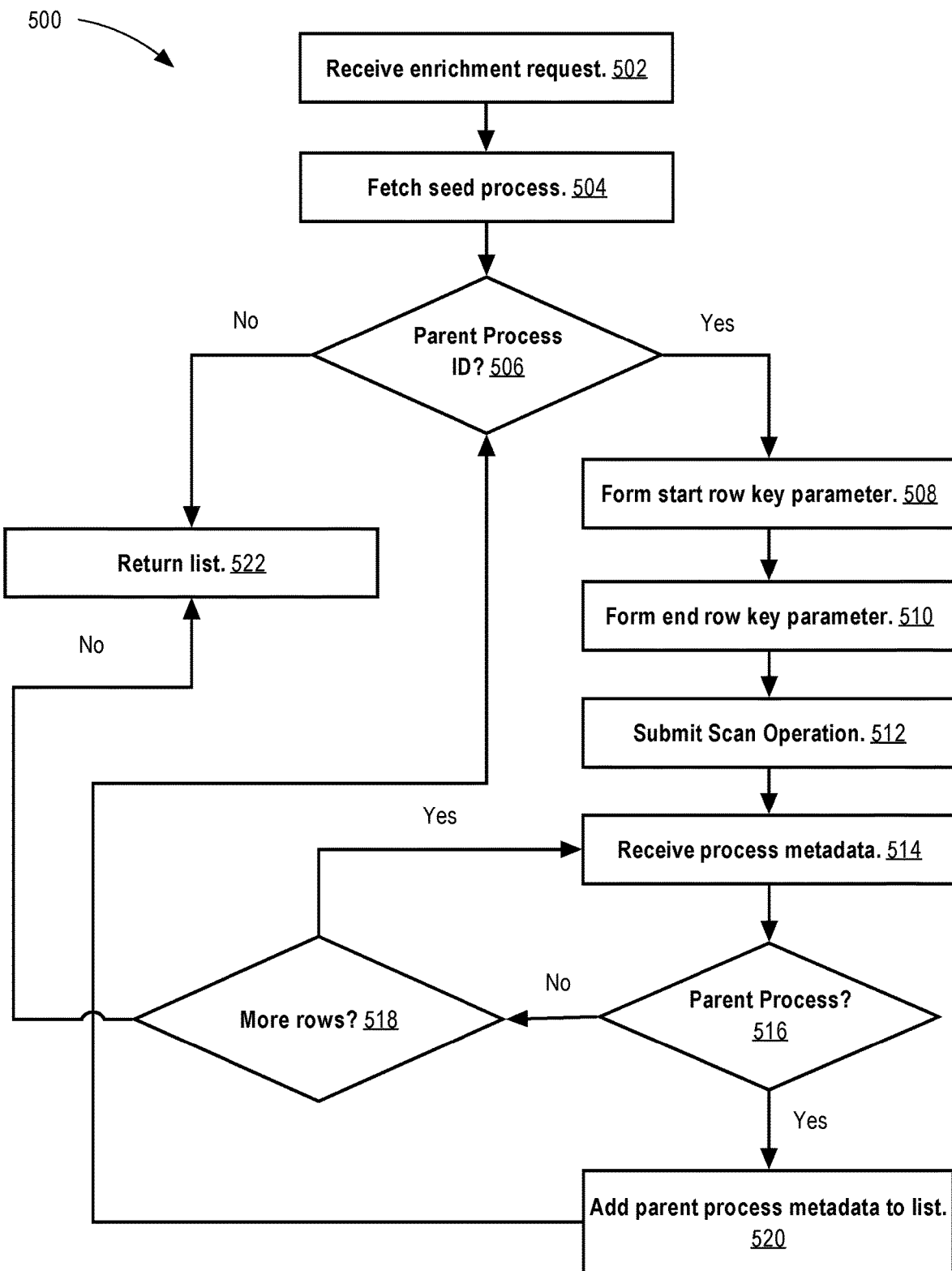
FIG. 5 is a flowchart representation of a method of an embodiment for processing a back trace enrichment request.

Turning now to FIG. 5, it is a flowchart 500 of a method performed by the endpoint provider 150 in processing an enrichment request from analyst workstation 160 according to an embodiment.

At operation 502, the enrichment request is received at the back trace endpoint 152 of the endpoint provider 150. The enrichment request specifies at least a target hostname, a target process id, and a target timestamp. The target hostname, the target process id, and the target timestamp may be provided by an analyst at analyst workstation 160, for example. The enrichment request may optionally specify a target event id, for example, if the target event id is available to the analyst.

At operation 504, the fetch method described above with respect to FIG. 4 is performed to fetch the row for the "seed" process for the enrichment request. The seed process corresponds to a row in the execs table 200 identified either by performing a Get Operation or a Scan Operation as described above with respect to operations 408 and 416, respectively, depicted in FIG. 4. The column value(s) of the row containing the metadata of the seed process may be added as the first item in a list that will be returned to the analyst workstation 160 as an answer to the enrichment request.

At operation 506, the seed process metadata is inspected to determine if a parent process id is present. If one is not present, then it is assumed there are no rows for ancestor processes of the seed process in the execs table 200 and the back trace list with just the seed process metadata is returned to the analyst workstation 160 at operation 522. If, however, at operation 506, a parent process id is present in the seed process metadata, then the seed event is considered the current process and the method of FIG. 5 proceeds to operation 508.

At operation 508, a start row key parameter is formed for a Scan Operation to be submitted at operation 512. The start row key parameter is formed based on the target hostname of the enrichment request, the parent process id of the current process metadata, and the process creation timestamp of the current process metadata. The start row key parameter may be formed at operation 508 using these values similar to how the start row key parameter is formed at operation 406 described above except that the parent process id of the current process is used to match against the process identifier field 204 instead of the target process id of the enrichment request, and the process creation timestamp of the current process metadata is used to match against the timestamp field 206 instead of the target timestamp of the enrichment request. The event id field of the start row key parameter may be formed as in operation 412 described above.

At operation 510, an end row key parameter is formed for the Scan Operation to be submitted at operation 512. The end row key parameter is formed based on the target hostname of the enrichment request and the parent process id of the current process metadata. The end row key parameter may be formed at operation 510 using these values similar to how the end row key parameter is formed at operation 414 described above except that the parent process id of the current process metadata is used to match against the process identifier field 204 instead of the target process id of the enrichment request. The timestamp field and the event id field of the end row key parameter may be formed as in operation 414 described above.

At operation 512, a Scan Operation is requested of distributed storage system 140 against the execs table 200. The start row key parameter and the end row key parameter formed at operations 508 and 510, respectively, are specified as input parameters to the Scan Operation. The start row key parameter and the end row key parameter define the range of the Scan Operation.

At operation 514, the column value(s) of the first row returned by the distributed storage system 140 after initiating the Scan Operation are returned to the endpoint provider 150. It may be the case that the process represented by this first row was created at a host at the same time as the current process (e.g., within the same second). Thus, a determination is made at operation 516 whether the process creation timestamp of the process represented by the first returned row is equal to the process creation timestamp of the current process and, if equal, whether the event id of the process represented by the first returned row is less than the event id of the current process. If the process represented by the first returned row is the parent process of the current process, then it should have an earlier process creation event id than the event id for the process creation of the current process. If it is determined at operation 516 that the process creation timestamp are equal and the event id of the returned process is not less than the event id of the current process, then, at operation 518, if there are more rows returned by the Scan Operation submitted at operation 512, the next returned row is evaluated at operation 516 like the first returned row was previously evaluated at operation 516. Operations 514, 516, and 518 may repeat in a loop until the first of: a) a row is returned representing a process that does not have a process creation timestamp equal to the process creation timestamp of the current process or, if the timestamps are equal, has an event id that is less than the event id of the current process, or b) no more rows are returned from the Scan Operation. In the case of b), the method of FIG. 5 may proceed to operation 522 where the list as currently populated is returned to the analyst workstation 160.

At operation 520, if a parent process is confirmed at operation 516, then the process metadata obtained from the distributed storage system 140 is added as the next list item to the list. This parent process becomes the new current process and the method returns to operation 506. Operations 506-520 may be repeated for each new current process until at operation 506 it is determined that a current process does not have a parent process.

At operation 522, if the current process does not have a parent process as determined at operation 506, then the list as currently populated is returned to the analyst workstation 160. The list contains one or more list items where the first item in the list represents the seed process, and the next item in the list, if there is one, represents the parent process of the seed process, and the next item after that one in list, if there is one, represents the grandparent process of the seed process, and so on, for all ancestor processes identified in the execs table 200 according to the method of FIG. 5.

Follow Enrichment Request

Figure 6:
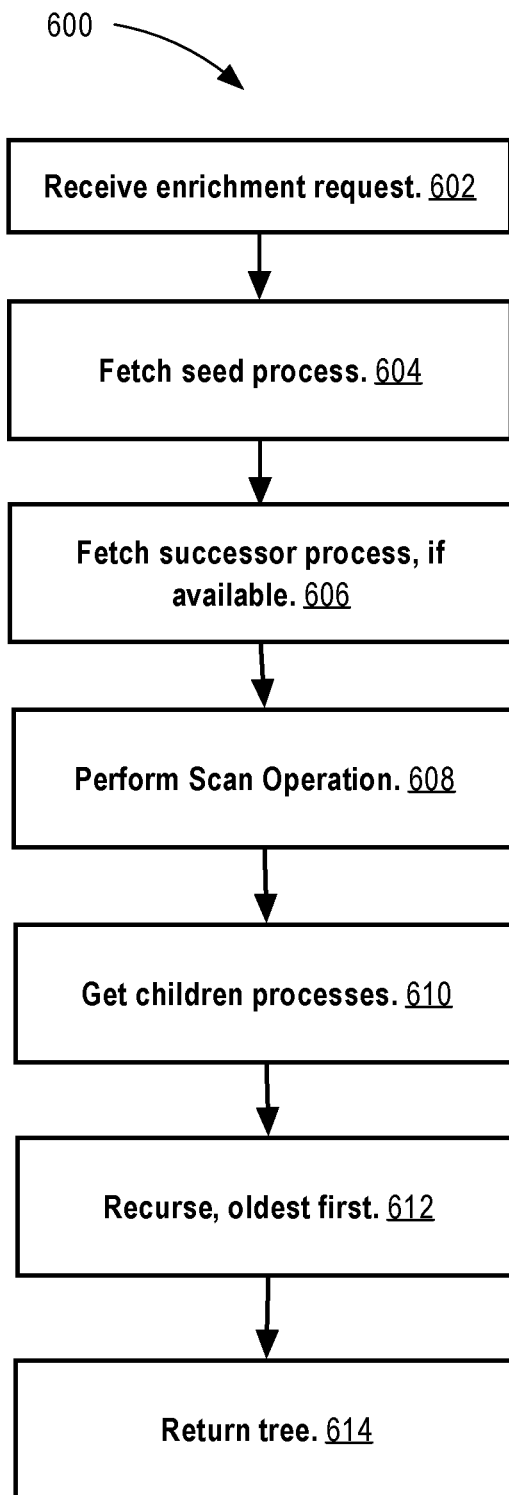
FIG. 6 is a flowchart representation of a method of an embodiment for processing a follow enrichment request.

Turning now to FIG. 6, it is a flowchart 600 of a method performed by the endpoint provider 150 in processing an enrichment request from analyst workstation 160 according to an embodiment.

At operation 602, the enrichment request is received at the follow endpoint 153 of the endpoint provider 150. The enrichment request specifies at least a target hostname, a target process id, and a target timestamp. The target hostname, the target process id, and the target timestamp may be provided by an analyst at analyst workstation 160, for example. The enrichment request may optionally specify a target event id, for example, if the target event id is available to the analyst.

At operation 604, the fetch method described above with respect to FIG. 4 is performed to fetch the row for the seed process for the enrichment request. The seed process corresponds to a row in the execs table 200 identified either by performing a Get Operation or a Scan Operation as described above with respect to operations 408 and 416, respectively, depicted in FIG. 4. The column value(s) of the row containing the metadata of the seed process may be added as the root node item in a tree data structure that will be returned to the analyst workstation 160 as an answer to the enrichment request.

Initially, the seed process is taken as the current process. To find all of the current process' descendants, the lifetime of the current process is determined. Specifically, an upper bound on the lifetime of the current process is determined from the row, if it exists, immediately preceding the row for the current process in the execs table 200 for the same hostname as the current process and the same process id as the current process. The process represented by this row, if it exists, is referred to as the successor process to the current process. If the row for the successor process does not exist in the execs table 200, then a current time is taken as the upper bound.

At operation 606, to determine if a successor process is available, a Scan Operation is performed against the execs table 200 where the hostname field and the process id field of both the start row key parameter and the end row key parameter are set based on the target hostname of the enrichment request and the process id of the current process, respectively. Each byte of the timestamp field of the start row key parameter and each byte of the event id field of the start row key parameter is set to a minimum byte value (e.g., \x00) so that the Scan Operation scan over the most recent processes at the hostname with the process id. For the end row key parameter, the timestamp field is taken as the bit wise one's complement of the process creation timestamp of the current process and the event id field is taken as the bit wise one's complement of the event id for the current process so that the Scan Operation will stop at the row for the successor process, if the row exists in the execs table 200. The last row returned from the Scan Operation using these start and end row parameters is the row for the successor process, if a row is returned from the Scan Operation.

The upper bound on the lifetime of the current process is either the current time, if a successor process was not identified at operation 606, or the time of the process creation timestamp of the successor process, if a successor process was identified at operation 606. The lower bound on the lifetime in either case is the time of the process creation timestamp of the current process.

At operation 608, using the upper bound timestamp and the lower bound timestamp on the lifetime of the current process, a Scan Operation is performed against the parents table 300 to identify any child processes of the current process. For this Scan Operation, the start row key parameter is based on the target hostname of the enrichment request for the hostname field, the process id of the current process for the parent process id field, the lower bound timestamp for the timestamp field, and minimum byte values (e.g., \x00) for the event id field. The end row parameter is based on the target hostname of the enrichment request for the hostname field, the process id of the current process for the parent process id field, the upper bound timestamp for the timestamp field 306 and maximum byte values (e.g., \xFF) for the event id field.

Each row of the parents table 300 returned from the Scan Operation initiated at operation 608 preferably includes the row key and, as the column value, a process identifier of a child process of the current process. This child process identifier may be used to form a row key parameter to pass in a Get Operation against the execs table 200 to directly retrieve the process metadata for the child process. Along with the child process identifier for the process id field of the row key parameter, the hostname field of the row key parameter can be based on the value of the hostname field 302 of the row returned from the parents table 300, the timestamp field of the row key parameter can be taken as the bitwise one's complement of the timestamp field 306 of the returned row, and the event id field of the row key parameter can be taken as the bitwise one's complement of the event id field 306 of the returned row. The Get Operation can be performed against the execs table 200 in this way for each row of the parents table 300 returned from the Scan Operation. The process metadata of rows returned by the Get Operations can be added to the tree data structure as child nodes of the node corresponding to the current process.

At operation 612, operations 606-610 are repeated recursively in an oldest created child process first manner until the entire descendant tree is constructed.

At operation 614, the completed tree is returned to the analyst workstation 160 for presentation in a graphical user interface at the analyst workstation.

Basic Hardware Machine

Figure 7:
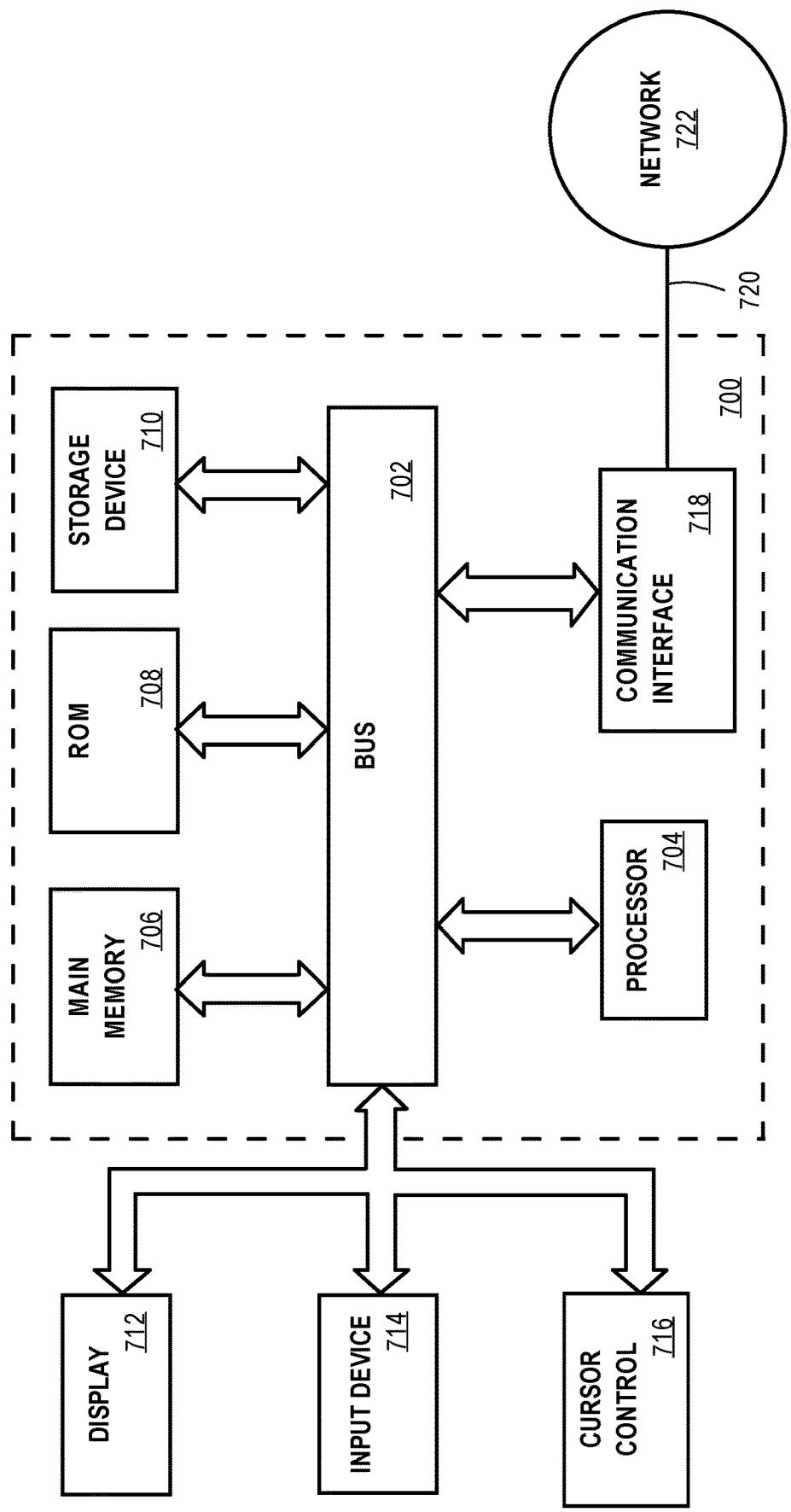
FIG. 7 is a schematic representation of a basic hardware machine with which an embodiment may be implemented.

Referring now to FIG. 7, it is a block diagram that illustrates basic hardware machine 700 in one or more of which an embodiment may be embodied. Hardware machine 700 may be a component of an overall computing system configured to implement techniques, process, and methods described herein. The overall computing system may include one or more such hardware machines 700.

Hardware machine 700 and its hardware components, including their connections, relationships, and functions, is meant to be exemplary only, and not meant to limit implementations of an embodiment. Other hardware machines suitable for implementing an embodiment may have different components, including components with different connections, relationships, and functions.

Hardware machine 700 may include bus 702 or other communication mechanism for addressing main memory 706 and for transferring data between and among the various components of hardware machine 700.

Hardware machine 700 may also include processor 704 coupled with bus 702 for processing information. Processor 704 may be a general purpose microprocessor, a system on a chip (SoC), or other hardware processor.

Main memory 706, such as a random access memory (RAM) or other dynamic storage device, also may be coupled to bus 702 for storing information and software instructions to be executed by processor 704. Main memory 706 also may be used for storing temporary variables or other intermediate information during execution of software instructions to be executed by processor 704.

Software instructions, when stored in storage media accessible to processor 704, render hardware machine 700 into a special-purpose computing machine that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a machine to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Hardware machine 700 also may include read only memory (ROM) 708 or other static storage device coupled to bus 702 for storing static information and software instructions for processor 704.

Mass storage devices 710 may be coupled to bus 702 for persistently storing information and software instructions on fixed or removable media, such as magnetic, optical, solid-state, magnetic-optical, flash memory, or any other available mass storage technology. The mass storage may be shared on a network, or it may be dedicated mass storage. Mass storage device 710 may store a body of program and data for directing operation of hardware machine 700, including an operating system, user application programs, driver and other support files, as well as other data files of all sorts.

Hardware machine 700 may be coupled via bus 702 to display 712, such as a liquid crystal display (LCD) or other electronic visual display, for displaying information to a computer user. In a configuration, a touch sensitive surface incorporating touch detection technology (e.g., resistive, capacitive, etc.) may be incorporated within display 712 to form a touch sensitive display for communicating touch gesture (e.g., finger or stylus) input to processor 704.

Input device 714, including alphanumeric and other keys, may be coupled to bus 702 for communicating information and command selections to processor 704. In addition to or instead of alphanumeric and other keys, input device 714 may include one or more physical buttons or switches such as, for example, a power (on/off) button, a "home" button, volume control buttons, or the like.

Another type of user input device may be cursor control 716, such as a mouse, a trackball, touchpad, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

While in a configuration, one or more of display 712, input device 714, and cursor control 716 are external components (i.e., peripheral devices) of hardware machine 700, some or all of display 712, input device 714, and cursor control 716 are integrated as part of the form factor of hardware machine 700 in a configuration.

Functions of the disclosed systems, methods, and modules may be performed by hardware machine 700 in response to processor 704 executing one or more programs of software instructions contained in main memory 706. Such software instructions may be read into main memory 706 from another storage medium, such as storage device 710. Execution of the software instructions contained in main memory 706 cause processor 704 to perform the functions of an embodiment.

While functions and operations of an embodiment may be implemented entirely with software instructions, hard-wired or programmable circuitry of hardware machine 700 (e.g., an ASIC, a FPGA, or the like) may be used in an embodiment in place of or in combination with software instructions to perform the functions, according to the requirements of the particular implementation at hand.

The term "storage media" as used herein refers to any non-transitory media that store data and/or software instructions that cause a hardware machine to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as a storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more software instructions to processor 704 for execution. For example, the software instructions may initially be carried on a magnetic disk or solid-state drive of a remote computer. The remote computer can load the software instructions into its dynamic memory and send the software instructions over a data communications network. The hardware machine 700 can receive the data over the data communications network and appropriate circuitry can place the data on bus 702. Bus 702 carries the data to main memory 706, from which processor 704 retrieves and executes the software instructions. The software instructions received by main memory 706 may optionally be stored on storage device 710 either before or after execution by processor 704.

Hardware machine 700 may include communication interface 718 coupled to bus 702. Communication interface 718 provides a two-way data communication coupling to a wired or wireless network link 720 that connects hardware machine 700 to data communications network 722 (e.g., a local area network (LAN), a wide area network (WAN), a wireless local area network (WLAN), a metropolitan area network (MAN), a storage area network (SAN), etc.). Network link 720 typically provides data communication through network 722 to one or more other data devices.

Communication interface 718 may send and receive electrical, electromagnetic, or optical signals that carry digital data streams representing various types of information. For example, communication interface 718 may be a wired network interface card, a wireless network interface card with an integrated radio antenna, or a modem.

For example, network link 720 may provide a connection through network 722 to a host computer or to data equipment operated by an Internet Service Provider (ISP). The ISP may in turn provide data communication services through the world wide packet data communication network now commonly referred to as the "Internet". Network 722 and Internet use electrical, electromagnetic or optical signals that carry digital data streams. The signals through the various networks and the signals on network link 720 and through communication interface 718, which carry the digital data to and from hardware machine 700, are example forms of transmission media.

Hardware machine 700 can send messages and receive data, including program code, through network 722, network link 720, and communication interface 718. In the Internet example, a server might transmit a requested code for an application program through Internet, ISP, and network 722 and communication interface(s) 718.

The received code may be executed by processor 704 as it is received, and/or stored in storage device 710, or other non-volatile storage for later execution.

Basic Software System

Figure 8:
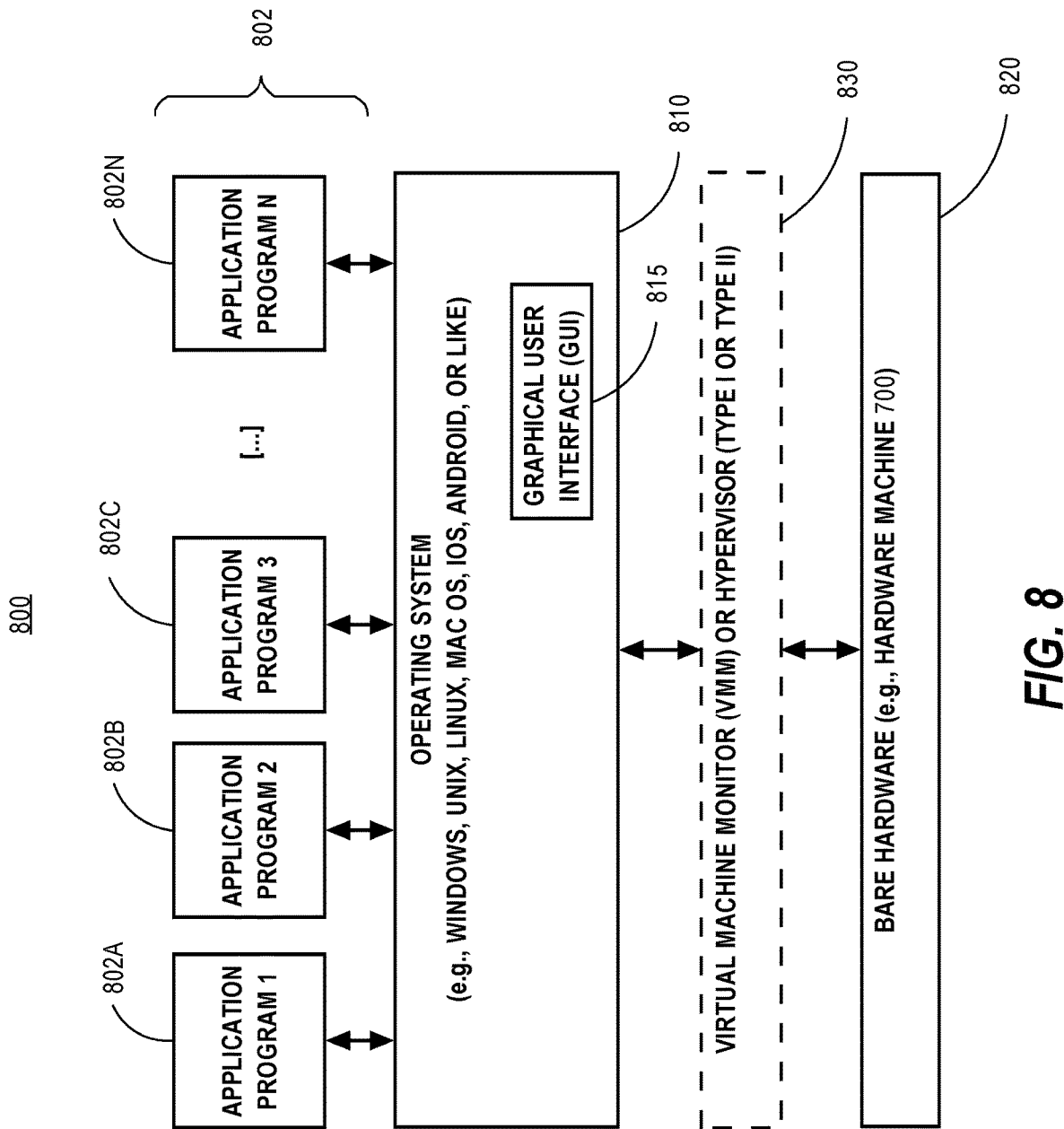
FIG. 8 is a schematic representation of a basic software system for controlling the operation of the basic hardware machine.

FIG. 8 is a block diagram of basic software system 800 that may be employed for controlling the operation of hardware machine 700. Software system 800 may be a component of an overall computing system configured to implement techniques, processes, and methods described herein. The overall computing system may include one or more such software systems 1100 on one or more hardware machines 800.

Software system 800 and its software components, including their connections, relationships, and functions, is meant to be exemplary only, and not meant to limit implementations of an embodiment. Other software systems suitable for implementing an embodiment may have different components, including components with different connections, relationships, and functions.

Software system 800 is provided for directing the operation of hardware machine 700. Software system 800, which may be stored in system memory (RAM) 706 and on fixed storage (e.g., hard disk or flash memory) 710, includes kernel or operating system (OS) 810.

OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by hardware machine 700. The applications or other software intended for use on hardware machine 700 may also be stored as a set of downloadable computer-executable instructions, for example, for downloading and installation from an Internet location (e.g., a Web server, an app store, or other online service).

Software system 800 includes graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. GUI 815 also serves to display the results of operation from the OS 810 and applications 802, whereupon the user may supply additional inputs or terminate the session (e.g., log off).

OS 810 and applications 802 can execute directly on bare hardware 820 (e.g., hardware machine 700). Alternatively, a hypervisor or virtual machine monitor (VMM) 830 may be interposed between the bare hardware 820 and OS 810. In this configuration, VMM 830 acts as a software "cushion" or virtualization layer between the OS 810 and bare hardware 820.

VMM 830 instantiates and runs one or more virtual machine instances. Each virtual machine comprises a "guest" operating system, such as OS 810, and one or more applications, such as applications 802, designed to execute on the guest operating system. 830 presents the guest operating systems with a virtual operating platform and manages the execution of the guest operating systems.

In a configuration, VMM 830 allows a guest operating system to run as if it is running on bare hardware 820 directly. In these instances, the same version of the guest operating system configured to execute on bare hardware 820 directly may also execute on VMM 830 without modification or reconfiguration. In other words, VMM 830 may provide full hardware and CPU virtualization to a guest operating system.

In a configuration, a guest operating system may be specially designed or configured to execute on VMM 830. In these instances, the guest operating system is "aware" that it executes on a virtual machine monitor. In other words, VMM 830 may provide para-virtualization to a guest operating system Conclusion As a person skilled in the art will recognize from the previous detailed description and from the figures and claims, modifications and changes can be made to an embodiment without departing from the scope of this invention defined in the following claims.

The invention claimed is:

1. A method performing by a computing system comprising one or more processors and memory, the method comprising:
  storing a table accessible to a distributed storage system;
  wherein the table comprises a plurality of rows;
  wherein each row of the plurality of rows represents a corresponding process creation event of a corresponding process and wherein the corresponding process creation event occurs at a corresponding host at which the corresponding process executes;
  wherein each row of the plurality of rows comprises a corresponding row key;
  wherein, for each row of the plurality of rows, the corresponding row key of the row comprises a corresponding first field, a corresponding second field, and a corresponding third field;
  wherein, for each row of the plurality of rows, the corresponding first field of the corresponding row key of the row identifies the corresponding host at which the process creation event corresponding to the row occurred;
  wherein, for each row of the plurality of rows, the corresponding second field of the corresponding row key of the row identifies the corresponding process of the process creation event corresponding to the row;
  wherein, for each row of the plurality of rows, the corresponding third field of the corresponding row key of the row identifies a corresponding time at which the process creation event corresponding to the row occurred;
  receiving a request comprising a target hostname, a target process identifier, and a target timestamp;
  forming a byte sequence based, at least in part, on the target hostname, the target process identifier, and the target timestamp; and
  submitting a scan operation to the distributed storage system for execution against the table, the byte sequence passed as a parameter to the scan operation to specify a start row key of a range of the scan operation.

2. The method of claim 1, wherein rows, of the plurality of rows, having the same value for the corresponding first fields of the corresponding row keys of the rows, are stored within the table in descending order of the corresponding times at which the process creation events corresponding to the rows occurred.

3. The method of claim 1, wherein, for each row of the plurality of rows, the corresponding third field of the corresponding row key of the row identifies the corresponding time at which the process creation event corresponding to the row occurred using a value that is a bitwise one's complement of a value representing the corresponding time; and wherein the forming the byte sequence is based, at least in part, a bitwise one's complement of the target timestamp.

4. The method of claim 1, wherein, for each row of the plurality of rows, the corresponding row key of the row comprises the corresponding first field, the corresponding second field following the corresponding first field, and the corresponding third field following the corresponding second field.

5. The method of claim 1, further comprising:
receiving, as a result of the scan operation, a set of one or more column values of a particular row of the plurality of rows; and
returning the set of one or more column values in a response to the request.

6. The method of claim 1, further comprising:
receiving, as a result of the scan operation, one or more column values of a particular row of the plurality of rows; and
wherein the one or more columns values comprise an identifier of a process that created the corresponding process of the process creation event corresponding to the particular row.

7. The method of claim 1, wherein:
the scan operation is a first scan operation;
the byte sequence is a first byte sequence;
the method further comprises:
receiving, as a result of the first scan operation, a set of one or more column values of a first row of the table;
obtaining, from the set of one or more column values, a parent process identifier for the corresponding process of the process creation event corresponding to the first row;
obtaining, from the set of one or more column values, a process creation timestamp for the corresponding process of the process creation event corresponding to the first row;
forming a second byte sequence based, at least in part, on the target hostname, the parent process identifier, and the process creation timestamp; and
submitting a second scan operation to the distributed storage system for execution against the table of the distributed storage system, the second byte sequence passed as a parameter to the second scan operation to specify a start row key of a range of the second scan operation.

8. The method of claim 1, wherein:
for each row of the plurality of rows, the corresponding row key of the row comprises a corresponding fourth field; and
for each row of the plurality of rows, the corresponding fourth field of the corresponding row key of the row comprises an event identifier of the process creation event corresponding to the row.

9. The method of claim 1, wherein:
for each row of the plurality of rows, the corresponding row key of the row comprises a corresponding fourth field; and
for each row of the plurality of rows, the corresponding fourth field of the corresponding row key of the row comprises an event identifier of the process creation event corresponding to the row using a value that is a bitwise one's complement of a value representing the event identifier.

10. The method of claim 1, wherein:
the table is a first table;
the method further comprises storing a second table accessible to the distributed storage system;
the second table comprises a plurality of rows;
each row of the plurality of rows of the second table represents a corresponding process creation event of a corresponding process and comprises a corresponding row key;

for each row of the plurality of rows of the second table, the corresponding row key of the row of the second table comprises a corresponding first field, a corresponding second field, and a corresponding third field;
for each row of the plurality of rows of the second table, the corresponding first field of the corresponding row key of the row identifies a corresponding host at which the process creation event corresponding to the row occurred;
for each row of the plurality of rows of the second table, the corresponding second field of the corresponding row key of the row identifies a corresponding process that is a corresponding parent process of the corresponding process of the process creation event corresponding to the row;
for each row of the plurality of rows of the second table, the corresponding third field of the corresponding row key of the row identifies a corresponding time at which the corresponding process creation event corresponding to the row occurred; and
for each row of the plurality of rows of the second table, the row comprises one or more columns values, the one or more column values comprising an identifier of the corresponding process of the process creation event corresponding to the row.

11. A computing system comprising:
one or more processors;
a table accessible to a distributed storage system, the table comprising a plurality of rows, each row representing a corresponding process creation event of a particular process at a particular host at a particular time and associated with a particular event identifier, each row comprising a row key identifying the particular host, the particular process, the particular time, and the particular event identifier of the process creation event corresponding to the row;
one or more storage media storing one or more programs for execution by the one or more processors, the one or more programs comprising instructions configured for:
receiving a request comprising a target hostname, a target process identifier, and a target timestamp;
forming a byte sequence based, at least in part, on the target hostname, the target process identifier, and the target timestamp; and
submitting a scan operation to the distributed storage system for execution against the table, the byte sequence passed as a parameter to the scan operation to specify a start row key of a range of the scan operation.

12. The computing system of claim 11, wherein each row of the table comprises a bitwise one's complement representation of the particular time of the process creation event corresponding to the row.

13. The computing system of claim 11, wherein each row of the table comprises a bitwise one's complement representation of the particular event identifier of the process creation event corresponding to the row.

14. The computing system of claim 11, wherein the table is a first table, and wherein the system further comprises a second table, each row of the second table representing a corresponding process creation event of a particular process at a particular host at a particular time and associated with a particular event identifier, the row comprising a row key identifying the particular host, a parent process of the particular process, the particular time, and the particular event identifier.

15. The computing system of claim 11, the instructions further configured for:

returning a response to the request, the response comprising information returned by the scan operation about the process creation event corresponding to a row of the table.

16. The computing system of claim 11, the instructions further configured for:
returning a response to the request, the response comprising information returned by the scan operation about the process creation event corresponding to a particular row of the table, the response further comprising information about one or more ancestor process creation events of the process creation event corresponding to the particular row of the table.

17. The computing system of claim 11, the instructions further configured for:
returning a response to the request, the response comprising information returned by the scan operation about the process creation event corresponding to a particular row of the table, the response further comprising information about one or more descendant process creation events of the process creation event corresponding to the particular row of the table.

18. The computing system of claim 11, wherein:
the byte sequence is a first byte sequence;
the instructions are further configured for forming a second byte sequence based, at least in part, on the target hostname and the target process identifier; and
the second byte sequence is passed as a parameter to the scan operation to specify an end row key of the range of the scan operation.

19. The computing system of claim 11, wherein the rows of the plurality of rows of the table are stored within the table in a sorted order of the row keys of the plurality of rows.

20. One or more non-transitory computer-readable media storing a data structure for access by a distributed storage system, the data structure comprising:
a plurality of rows, each row comprising a corresponding row key and one or more column values, each row of the plurality of rows representing a corresponding process creation event;
wherein, for each row of the plurality of rows, the corresponding row key of the row comprises a corresponding first field, a corresponding second field, a corresponding third field, and a corresponding fourth field;
wherein, for each row of the plurality of rows, the corresponding first field of the corresponding row key of the row identifies a corresponding host at which the process creation event corresponding to the row occurred;
wherein, for each row of the plurality of rows, the corresponding second field of the corresponding row key of the row identifies a corresponding process of the process creation event corresponding to the row;
wherein, for each row of the plurality of rows, the corresponding third field of the corresponding row key of the row identifies a corresponding time at which the process creation event corresponding to the row occurred;
wherein, for each row of the plurality of rows, the corresponding fourth field of the corresponding row key of the row comprises an event identifier assigned to the process creation event corresponding to the row;
wherein, for each row of the plurality of rows, the corresponding time identified by the corresponding third field of the corresponding row key of the row is represented in the corresponding row key of the row in a bitwise one's complement format;
and
wherein, for each row of the plurality of rows, the event identifier of corresponding fourth field of the corresponding row key of the row is represented in the corresponding row key of the row in a bitwise one's complement format.

* * * * *